March 22, 1955  J. B. DE BUZAREINQUES  2,704,518
PIVOTAL BODY SUPPORT FOR RAILWAY TRUCK
Filed Aug. 30, 1950
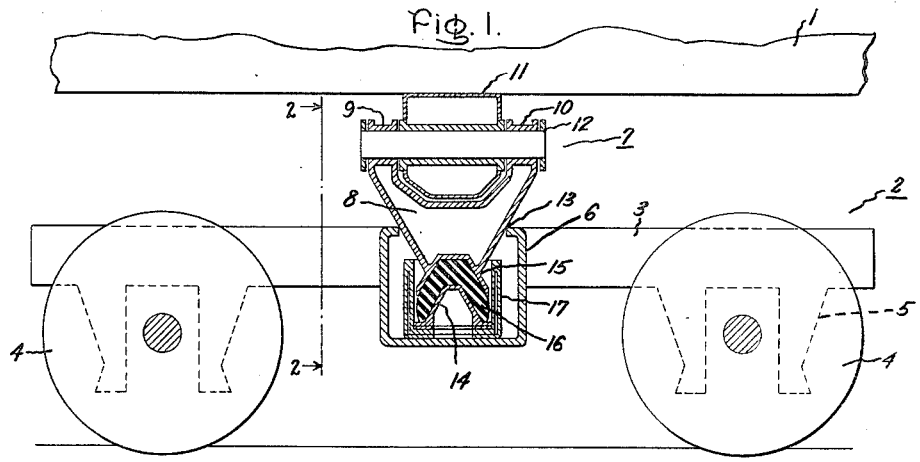
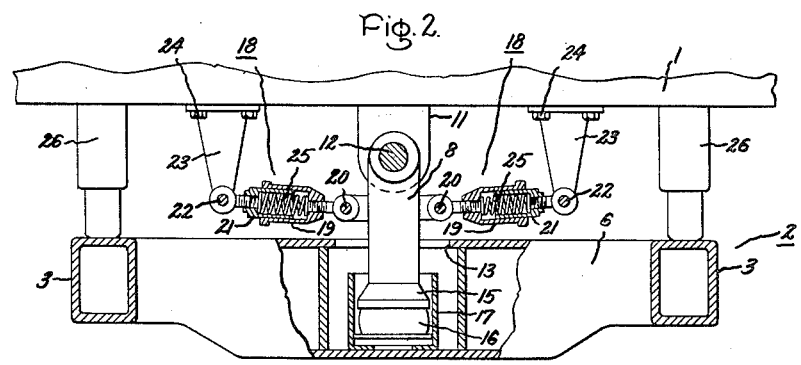
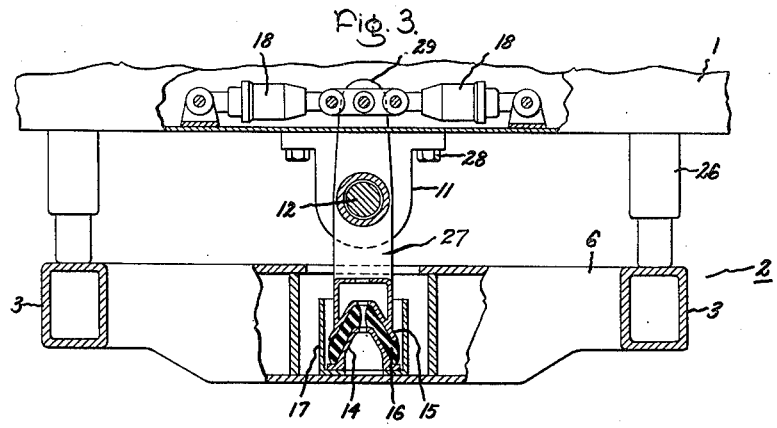
Inventor:
Jacques Bedel de Buzareinques,
by Ernest F. Britton
His Attorney.

United States Patent Office 2,704,518
Patented Mar. 22, 1955

2,704,518

PIVOTAL BODY SUPPORT FOR RAILWAY TRUCK

Jacques Bèdel de Buzareinques, Paris, France, assignor to General Electric Company, a corporation of New York Application August 30, 1950, Serial No. 182,210

2 Claims. (Cl. 105—199)

This invention relates to pivotal couplings between wheeled trucks and the vehicle body supported thereby and more particularly to pivotal couplings or center bearing constructions for use with the trucks of rail vehicles, for instance locomotives. This invention is particularly concerned with pivotal couplings of trucks of the laterally flexible type.

Trucks for rail vehicles, for example locomotives, are commonly provided with means for coupling the truck to the vehicle body so that the truck may pivot or swing with respect to the body. Furthermore, in order to secure body stability, means are customarily provided to allow the truck to move transversely with respect to the body. Trucks having this additional feature are commonly referred to as being of the laterally flexible type. In the design of such couplings, particularly for trucks having traction motors mounted on the axles, it is desirable to provide a construction which will not only permit the truck to pivot and move transversely with respect to the vehicle body, but which will also occupy the minimum space and in which the various components of the structure are readily accessible for inspection and maintenance.

An object of this invention is to provide an improved coupling between a wheeled truck and a vehicle body.

Another object of this invention is to provide an improved coupling of the laterally flexible type between a wheeled truck and a vehicle body.

A further object of this invention is to provide an improved coupling of the laterally flexible swing bolster type between a wheeled truck and a vehicle body characterized by its simplicity, minimum space occupied, and ready accessibility of components.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, there is provided a pivot member having a pivotal connection with the body permitting pivotal motion of the pivot member transversely of the body. The pivot member also has a swivel connection with the truck so that swivel and transverse motion of the truck with respect to the body is provided. Resilient means are connected between the body and the pivot member for restraining the transverse motion thereof.

In the drawing, Fig. 1 is a side elevational view in cross section illustrating the improved coupling structure of this invention; Fig. 2 is an end view, partly in cross section, taken along the line 2—2 of Fig. 1; and Fig. 3 is an end view, partly in section, illustrating a modified form of this invention.

Referring now to Fig. 1, there is shown a vehicle body 1, for instance a locomotive body, supported by a truck generally identified as 2. The truck 2 is provided with side frame members 3 and wheel and axle assemblies 4 supported by the conventional bearing pedestals 5 secured to the side frames 3. A transverse beam or sill member 6 connects the side frames 3 intermediate the wheel and axle assemblies 4 and serves to support the coupling assembly, generally identified as 7, now to be described.

The coupling assembly 7 comprises a pivot member 8 having a yoke portion at its upper end formed by jaws 9 and 10. The jaws 9 and 10 of the yoke portion of the pivot member 8 embrace a mounting member 11 secured to the underside of the body 1 in any suitable manner. While the mounting member 11 is shown as being in the nature of a projection along the centerline of the body 1, it will be readily understood that it can actually take the form of a sill extending transversely across the underside of the body 1. The pivot member 8 is pivotally connected to the mounting member 11 by a pin 12 arranged in suitable openings in the jaws 9 and 10 and the mounting member 11. The pin 12, it will be readily seen, is arranged parallel to the axis of the vehicle body 1 preferably along the center line thereof, so that the pivot member 8 may have a pivotal motion transversely of the body 1. In order to provide the connection of the pivot member 8 with the truck 2, an opening 13 is provided in the sill member 6 through which the lower portion of the pivot member 8 extends. A ball portion 14 is mounted in the bottom of the sill member 6, which, it is noted, is preferably formed as a channel, and a socket portion 15 is formed at the lower end of the pivot member 8. While the portion 14 is shown as being conical in form, it may of course have any other suitable shape. A cone 16 formed of resilient material, such as rubber, is shown as being interposed between the ball portion 14 and the socket portion 15 to complete the swivel connection. However, it will be readily understood, that a conventional ball and socket swivel connection can be provided to form the swivel joint at the lower end of the pivot member 8 connecting the pivot member to the truck 2 to provide for swinging of the truck with respect to the body 1. The swivel connection comprising the ball portion 14, the socket portion 15, and the resilient cone 16 is arranged on the longitudinal center line of the truck and is surrounded by a well 17 for retaining lubricant around the swivel joint, if required, and also for structural strength.

It will now be noted that the provision of the pivotal connection including the pin 12 permits the pivot member 8 to have a pivotal motion transversely of the body 1 and the swivel joint 14, 15 and 16 at the lower end of the pivot member 8 permits swinging of the truck with respect to the body so that the truck may both pivot and move transversely with respect to the body 1. In order to restrain the transverse motion of the pivot member 8 and the truck 2, resilient members 18 are arranged between the pivot member 8 and the body 1. Each resilient member 18 comprises an outer telescopic portion 19 having a pivotal connection 20 with the pivot member 8 and an inner telescopic portion 21 having a pivotal connection 22 with a post member 23 secured to the body 1 in any suitable manner, as by bolts 24. Springs 25 are arranged in the resilient members 18 intermediate the outer and inner telescopic portions 19 and 21 and serve to bias the pivot member 8 into the vertical position shown in Fig. 2 and to restrain transverse motion thereof. Loading pads 26, preferably containing springs, may be provided on the body 1 bearing on the side frames 3 in order to further stabilize the body against transverse pivotal motion on the swivel connection and to distribute the body load evenly on the side frames and the rails.

Referring now to Fig. 3, in which like elements are indicated by like reference numerals, there is shown a truck 2 supporting the body 1 and having side frames 3 connected by a center sill member 6. A pivot member 27 is provided having a pivotal connection by means of a pin 12 with a mounting member 11 secured to the vehicle body in any suitable manner, as by bolts 28. The pivotal connection is identical with that shown in Figs. 1 and 2, i. e. with the pin 12 parallel to the axis of the body 1, however, instead of being arranged at the upper end of the pivot member as in the case of Figs. 1 and 2, it is arranged intermediate the ends of the pivot member 27. In this case, the upper portion 29 extends into the body 1 through suitable openings (not shown) and the lower portion is provided with the swivel connection 14, 15 and 16, as in the case of Figs. 1 and 2. Here, resilient members 18 are connected to the upper portion 29 of the pivot member 27 and to the body 1, however they are arranged within the body 1 rather than underneath as shown in Figs. 1 and 2. The arrangement of Fig. 3 is designed to further economize space and permits inspection of the resilient members from inside the vehicle body.

It will now be readily apparent that this invention provides an improved structure for coupling a wheeled truck to a vehicle body which is characterized by its simplicity, economy of space occupied, and ready accessibility of the components for inspection and maintenance. It will be readily seen that the forces acting parallel to the axis of the truck, i. e. tractive and braking efforts, are transmitted from the pivot member to the body and vice versa through the pin 12 and the mounting member 11 while the forces acting transversely to the truck are transmitted through the resilient members 18.

While I have illustrated and described particular embodiments of this invention, further modifications and improvements will occur to those skilled in the art. I desire it to be understood therefore that this invention is not limited to the particular embodiments shown and I intend in the appended claims to cover all modifications within the spirit and scope of the invention.

What I claim as new and desire to secure by Letters Patent of the United States is:

1. In a vehicle having a body supported by a wheeled truck assembly, means for pivotally coupling said truck to said body comprising a pivot member, said member being pivoted intermediate its ends to said body on the longitudinal center line thereof for pivotal motion transversely thereof, one end of said member having a swivel connection with said truck on the longitudinal center line thereof whereby swivel and transverse motion of said truck with respect to said body is provided, resilient means connecting said body and the other end of said pivot member for restraining said transverse motion thereof, and means between said body and said truck for stabilizing said body against transverse pivotal motion on said swivel connection.

2. In a vehicle having a body supported by a wheeled truck assembly, means for pivotally coupling said truck to said body comprising a pivot member, said member being pivoted intermediate its ends to said body on the longitudinal center line thereof for pivotal motion transversely thereof, one end of said member having a swivel connection with said truck on the longitudinal center line thereof whereby swivel and transverse motion of said truck with respect to said body is provided, the other end of said pivot member extending into said body, resilient means arranged in said body connecting said body and the other end of said pivot member for restraining said transverse motion thereof, and spring means between said body and said truck for stabilizing said body against transverse pivotal motion on said swivel connection.

References Cited in the file of this patent

UNITED STATES PATENTS

| Number | Name | Date |
|---|---|---|
| 40,290 | Sweet | Oct. 13, 1863 |
| 972,286 | Summers | Oct. 11, 1910 |
| 2,404,091 | Portens | July 16, 1946 |

FOREIGN PATENTS

| Number | Country | Date |
|---|---|---|
| 931,590 | France | Feb. 26, 1948 |
| 644,392 | Germany | Apr. 30, 1937 |